US010963908B2

(12) United States Patent
Barros et al.

(10) Patent No.: US 10,963,908 B2
(45) Date of Patent: Mar. 30, 2021

(54) METHOD AND SYSTEM FOR CLOUD FUNDING USING A WEB BASED SOCIAL NETWORK

(71) Applicant: Bounta LLC, Campbell, CA (US)

(72) Inventors: Emanuel Fontes Barros, Santa Cruz, CA (US); Aric James Katterhagen, Campbell, CA (US)

(73) Assignee: Bounta LLC, Campbell, CA (US)

( * ) Notice: Subject to any disclaimer, the term of this patent is extended or adjusted under 35 U.S.C. 154(b) by 1157 days.

(21) Appl. No.: 14/494,578

(22) Filed: Sep. 23, 2014

(65) Prior Publication Data

US 2016/0086214 A1 Mar. 24, 2016

(51) Int. Cl.
*G06Q 30/00* (2012.01)
*G06Q 30/02* (2012.01)
*G06Q 50/00* (2012.01)

(52) U.S. Cl.
CPC ......... *G06Q 30/0246* (2013.01); *G06Q 50/01* (2013.01)

(58) Field of Classification Search
CPC ........................... G06Q 30/0246; G06Q 50/01
USPC ....................................................... 705/14.16
See application file for complete search history.

(56) References Cited

U.S. PATENT DOCUMENTS

| | | | | |
|---|---|---|---|---|
| 9,619,834 B2 * | 4/2017 | Tedjamulia | G06Q 10/10 | |
| 2009/0192871 A1 * | 7/2009 | Deacon | G06Q 50/01 | 705/319 |
| 2013/0054484 A1 * | 2/2013 | Hoeflinger | G06Q 30/0273 | 705/329 |
| 2014/0244400 A1 * | 8/2014 | Benyamin | G06Q 30/02 | 705/14.66 |
| 2015/0127438 A1 * | 5/2015 | Wedderburn | H04W 4/029 | 705/14.16 |

OTHER PUBLICATIONS

Information Markets, Walter De Gruyter, 2011, pp. 479-514.*
The Reputation Society, Massum and Tovey, MIT Press, 2011, pp. ix-25.*
HCI remixed : reflections on works that have influenced the HCI community, MIT Press, 2008: pp. 275-279.*
Why a Diagram is (Sometimes) Worth Ten Thousand Words, Larkin, Simon, Cognitive Science, 1987, pp. 65-100.*
Streetlights and Shadows, MIT Press, 2009, pp. 33-47.*
The future of the internet—and how to stop It, Yale University Press, 2008, Chapter(s) 1-9, [emphasis pp. 11-18].*

* cited by examiner

*Primary Examiner* — David J Stoltenberg
*Assistant Examiner* — Michael I Ezewoko
(74) *Attorney, Agent, or Firm* — Michael A. Guth

(57) ABSTRACT

A social media website which allocates points to participants for a variety of activities by either the participant or by others, who may be other participants. Allocation of points results in rankings of participants, wherein higher ranked participants are allocated more opportunities for accumulating advertising revenue. Ads placed throughout the system's various pages may have their potential conversion value ascribed to designated groups or persons, as the ranked participant desires. Retained revenues may be used by a participant to purchase goods from participating vendors.

5 Claims, 13 Drawing Sheets

230

| Home - About - FAQ | Website A | Jimmy Sands |

232 — Organizations      Cloud Point(s) (CP)

- ☒ ➤ Save The Fish    [100] [Transfer]
- ☐ ➤ Gizma LLC    [0]
- ☒ ➤ Local Elementary School    [100] [Transfer]
- ☐ ➤ Rotary Club    [0]
- ☒ ➤ bounta Wallet    [1,000] [Transfer]

233 — Individual Members

- ☒ ➤ Raistlin James Fontes    [50] [Transfer]
- ☒ ➤ Sally Raah    [200] [Transfer]
- ☐ ➤ Adon Noronha    [0]

234 — Cloud Points to Exchange for Ranking*   [1000] [200] [Transfer] [BANK]

Banked Cloud Points  **   [24,000]

Cloud Points Lifetime Earned   [10,000,000]

\* Cloud Points are exchanged periodically for Cloud Rank that determines Ad Conversion (AC) rate.
\*\* All earned Cloud Points are banked here and remain unexpired until members transfers out

Member's Cloud Points

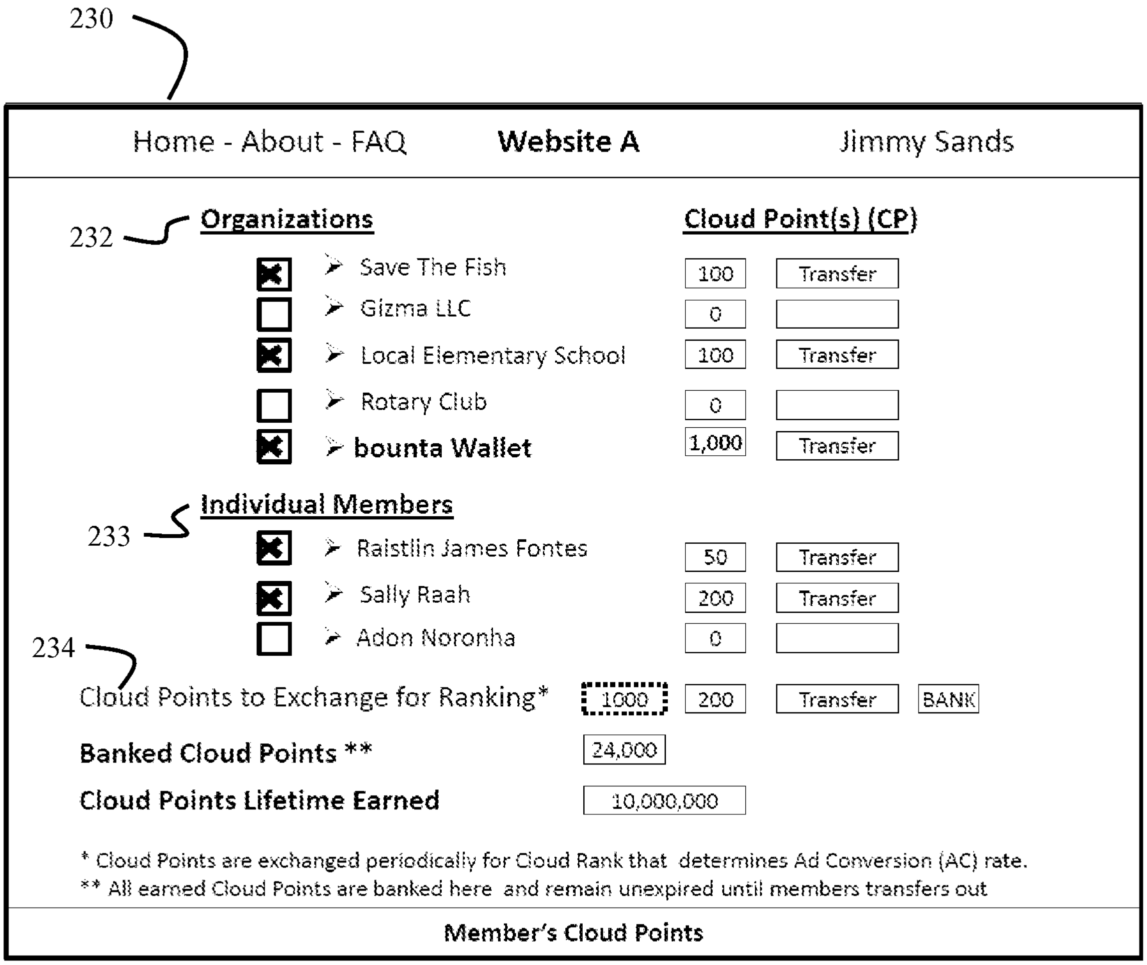

| Home - About - FAQ | Website B | Jimmy Sands |

264 — Organizations      Ad Conversion Distribution (ACD)

262 —
- ☒ ➤ Save The Fish    `10%` — 269
- ☐ ➤ Gizma LLC    `0%`
- ☒ ➤ Local Elementary School    `10%`
- ☐ ➤ Rotary Club    `0%`
- 274 ^ ☒ ➤ bounta Wallet    `40%` — 275

265 — Individual Members
- ☒ ➤ Raistlin James Fontes    `5%`
- ☒ ➤ Sally Raah    `10%`
- ☐ ➤ Adon Noronha    `0%` — 270

277 — 276 — Total ACD    `75%`

— 271

Member Ad Conversion (AC) Income    `25%`

278 — Total Ad Conversion    `100%` — 272    [SAVE]

Member's Ad Conversion Distribution

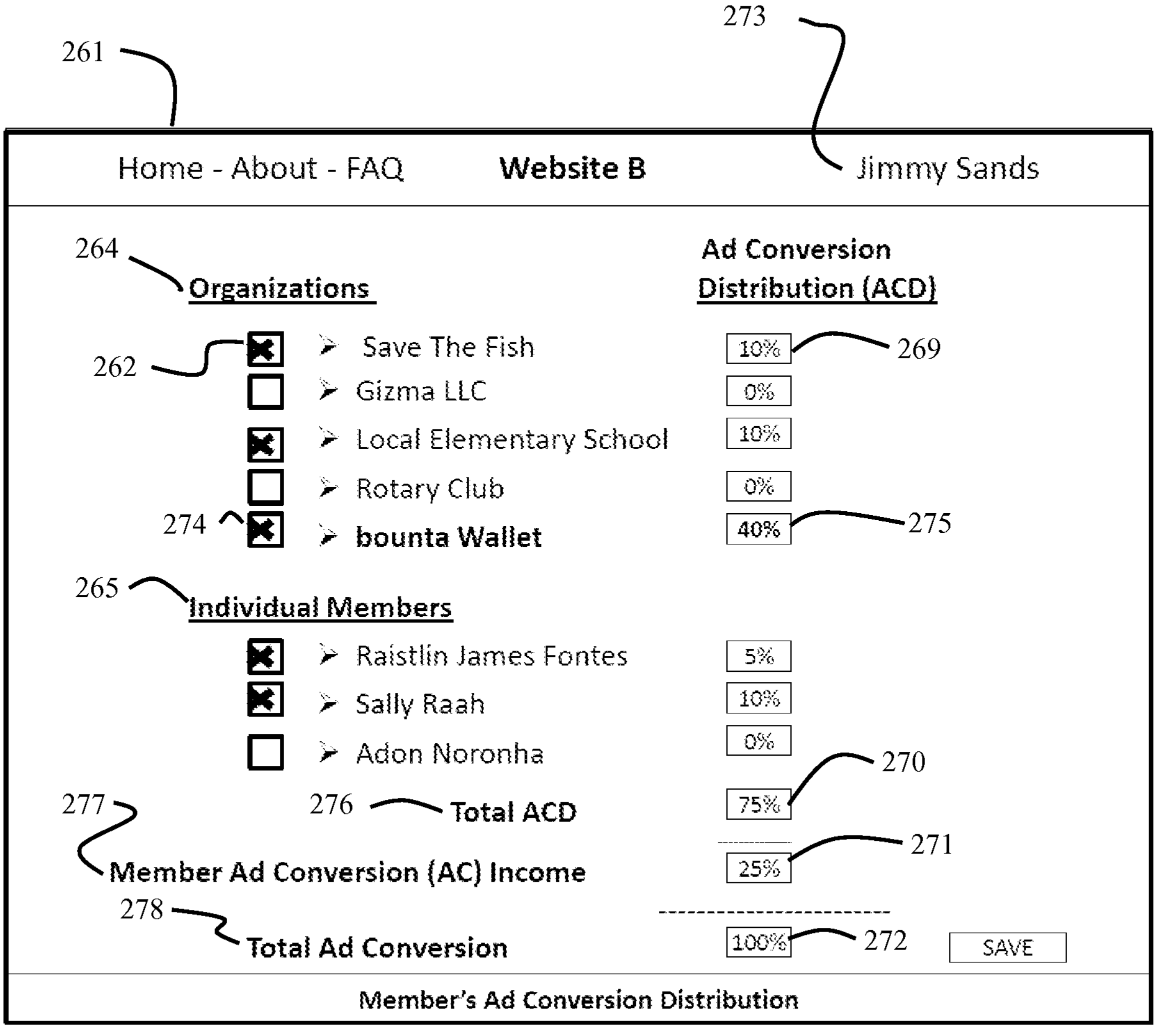

| Home - About - FAQ | Website B | Jimmy Sands |

282 — Organizations | Cloud Point(s) (CP) — 281
- ☒ ➤ Save The Fish | 100 | Transfer
- ☐ ➤ Gizma LLC | 0 | — 287
- ☒ ➤ Local Elementary School | 100 | Transfer
- ☐ ➤ Rotary Club | 0 | — 288
- ☒ ➤ bounta Wallet | 400 | Transfer 283 — Individual Members
- ☒ ➤ Raistlin James Fontes | 50 | Transfer
- ☒ ➤ Sally Raah | 200 | Transfer
- ☐ ➤ Adon Noronha | 0 |

284 — Cloud Points to Exchange for Ranking* | 1000 | 200 | Transfer | BANK
285 — Banked Cloud Points ** | 24,000
Cloud Points Lifetime Earned | 10,000,000
286

\* Cloud Points are exchanged periodically for Cloud Rank that determines Ad Conversion (AC) rate.
\*\* All earned Cloud Points are banked here and remain unexpired until members transfers out

Member's Cloud Points

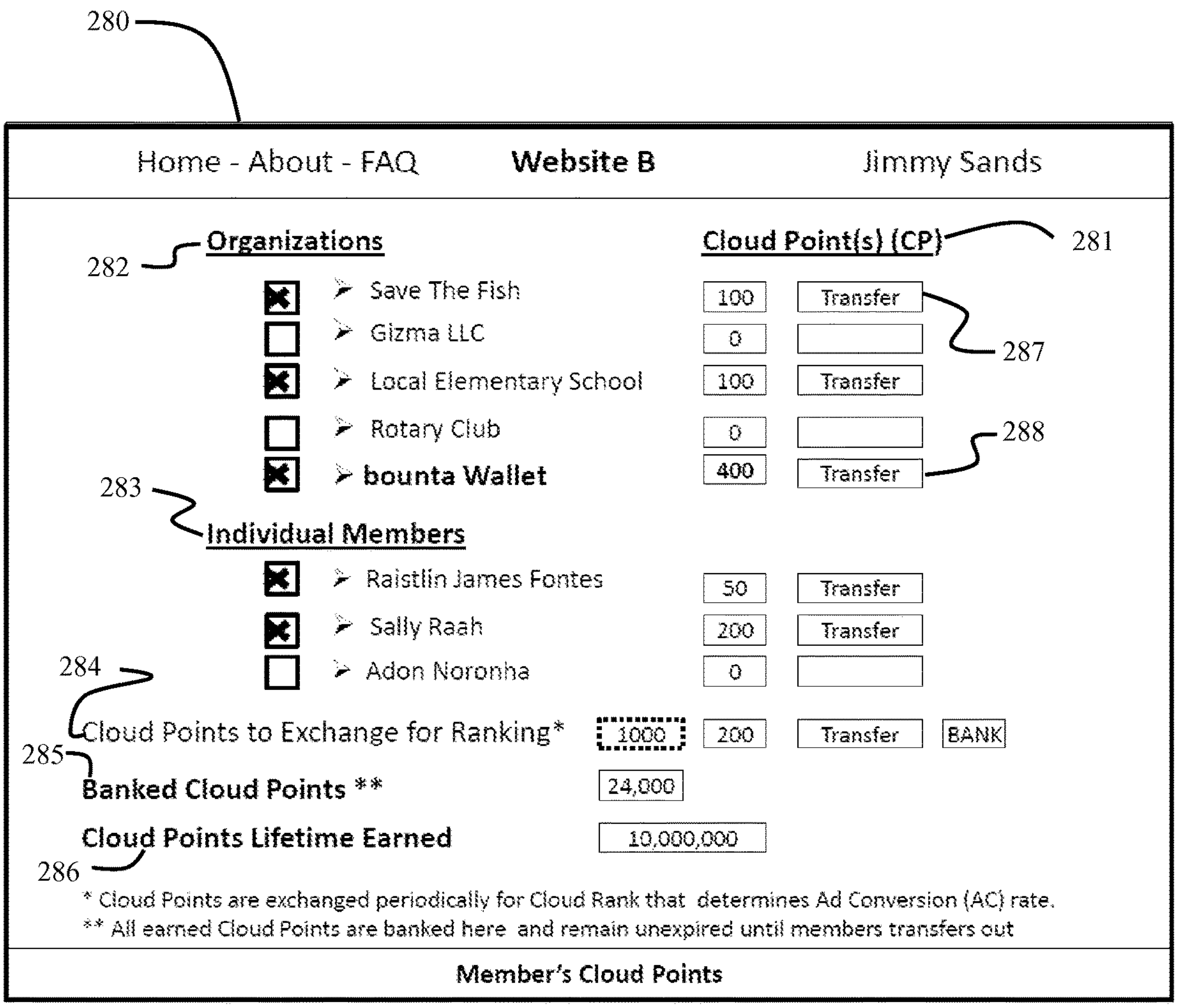

FIG. 7

| Home - About - FAQ | Website C | Jimmy Sands |

Organizations — 292

Cloud Point(s) (CP) — 291

| ☒ | ➤ Save The Fish | 100 | Transfer |
| ☐ | ➤ Gizma LLC | 0 | | — 297
| ☒ | ➤ Local Elementary School | 100 | Transfer |
| ☐ | ➤ Rotary Club | 0 | |
| ☒ | ➤ **bounta Wallet** | 500 | Transfer | — 298

293 — Individual Members

| ☒ | ➤ Raistlin James Fontes | 50 | Transfer |
| ☒ | ➤ Sally Raah | 200 | Transfer |
| ☐ | ➤ Adon Noronha | 0 | |

294

295 — Cloud Points to Exchange for Ranking*   [1000]  [200]  [Transfer]  [BANK]

Banked Cloud Points **   [24,000]

Cloud Points Lifetime Earned   [10,000,000]

296

\* Cloud Points are exchanged periodically for Cloud Rank that determines Ad Conversion (AC) rate.
\*\* All earned Cloud Points are banked here and remain unexpired until members transfers out Member's Cloud Points

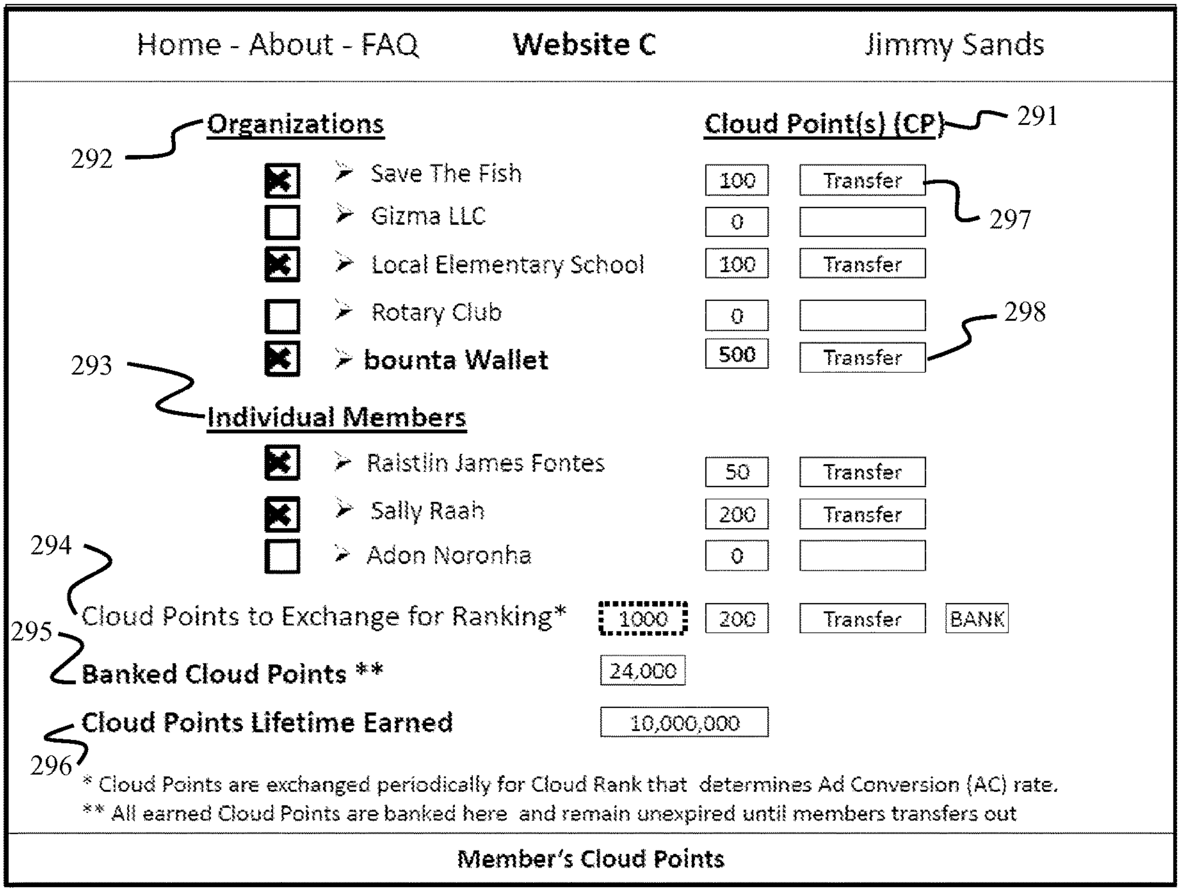

FIG. 9

| Home - About - FAQ | bounta | Jimmy Sands |

Buisness/Vendor | CPs |
|---|---|
| ☒ ➤ Web Hosting R Us | 400 | Transfer |
| ☐ ➤ Shoes All Around Inc. | 0 | |
| ☒ ➤ **Books All Around Inc.** | 1200 | Transfer |
| ☐ ➤ Outdoor Surplus Inc. | 0 | |

Individual Members
| ☒ ➤ Raistlin James Fontes | 100 | Transfer |
| ☒ ➤ Sally Raah | 200 | Transfer |
| ☐ ➤ Adon Noronha | 0 | |

bounta Wallet Total CPs | 1900

CPs Import from Website A  [ 1,000 ]
CPs Import from Website B  [  400  ] ⎬ Total Imported CPs
CPs Import from Website C  [  500  ]

bounta Wallet

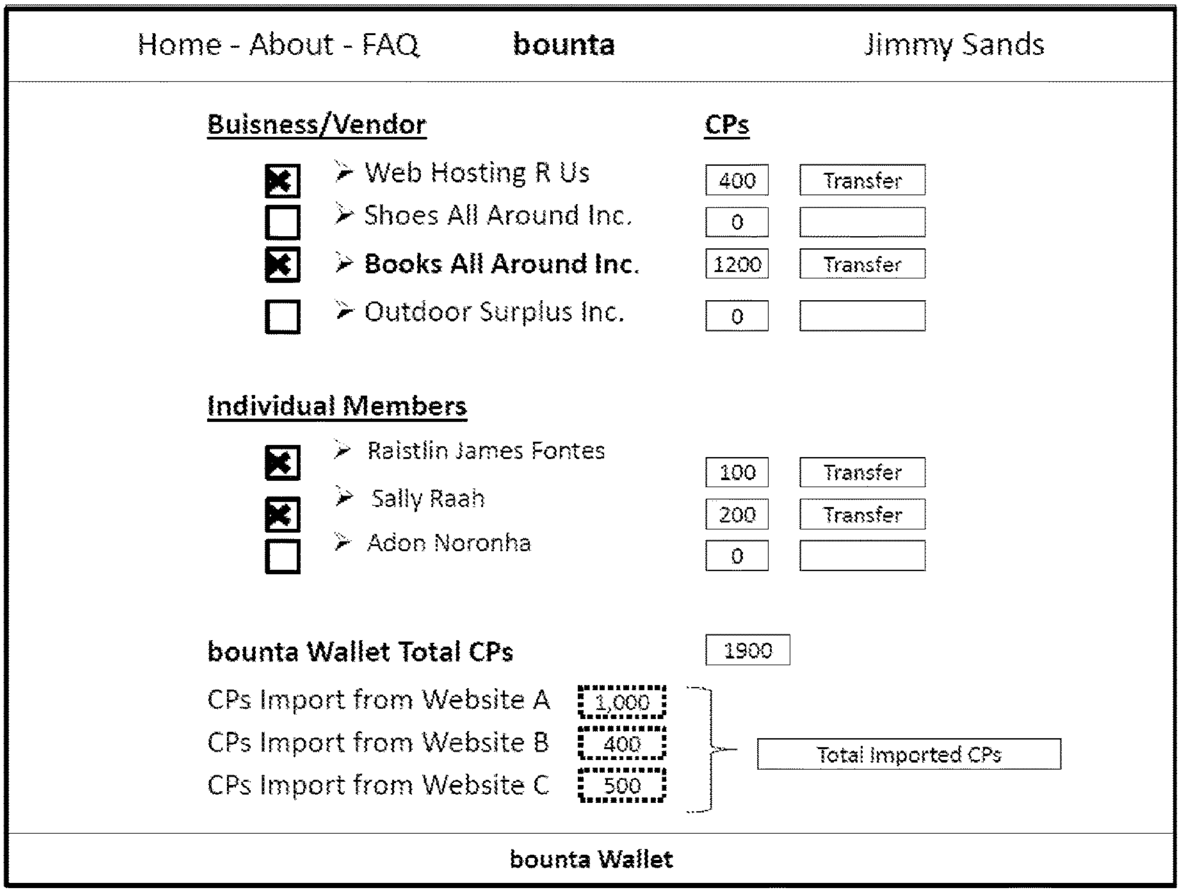

FIG. 12

| Home - About - FAQ | bounta | Jimmy Sands |

Books All Around Inc.  |  CP Price

- ☐ ➢ $50 Gift Certificate — 100 [BUY]
- ☒ ➢ 50 AC Gift Certificate — 50 [BUY]
- ☐ ➢ Movie DVD or Blu-ray — 25 [BUY]
- ☐ ➢ Music CD — 25 [BUY]
- ☒ ➢ Hobbit Book Box Set — 100 [BUY]

Vendor Wallet   1200  *

* CPs exchanged for goods or services are deducted from here

Vendor CP Exchange Page (Books All Around Inc)

METHOD AND SYSTEM FOR CLOUD FUNDING USING A WEB BASED SOCIAL NETWORK

BACKGROUND

Field of the Invention

The present invention pertains to systems that direct ad revenue, leverage website traffic, and allow for crowd funding, within a web-based social networking system.

Description of Related Art

As the Internet becomes more and more expansive, online communities may emerge which may desire to allow for the funding of ventures, which may include non-profit organizations dedicated to social or environmental causes. Such organizations are constantly faced with fundraising challenges.

Individuals using social media websites, which may include social media management dashboards, may be induced to use such a site, or to use it more frequently, if there is an opportunity to accumulate value, such as the opportunity to acquire goods and/or services, as the site is used. If the site also allowed for directing funding towards other organizations, such as the non-profit organizations referred to above, then a user would have the opportunity to fulfill the desire to promote certain groups while also allowing for some personal enrichment.

A way in which revenues may be generated when using websites may involve advertising embedded in such sites. The conversion of a placed ad may generate a monetary value for the person or group coupled to the placed ad. For example, if a visitor to a site page clicks onto an ad and visits the page associated with that ad, the ad placement service may pay a few cents to that ad space's designee. If the visitor then goes on to purchase on that site, the ad placement service may increase the payment.

Whereas crowd funding has typically involved direct financial contributions by users/participants to the activity, business venture, or social group, cloud funding allows for indirect or redirected funding wherein activities and actions taken by users can result in contributions, including financial contributions, to the activity, business venture, or social group, without a direct financial (dollar) contribution from the user/participant.

What is called for is a social website management system which allows for participants to accumulate opportunities to receive advertising revenues, but to also designate such opportunities to other groups should they desire. Such a website management system could facilitate cloud funding as well as user enrichment, and incentivize the pool of possible users to become participants in the system.

SUMMARY

A social media website which allocates points to participants for a variety of activities by either the participant or by others, who may be other participants. Allocation of points results in rankings of participants, wherein higher ranked participants are allocated more opportunities for accumulating advertising revenue. Ads placed throughout the system's various pages may have their potential conversion value ascribed to designated groups or persons, as the ranked participant desires. Retained revenues may be used by a participant to purchase goods from participating vendors.

BRIEF DESCRIPTION OF THE DRAWINGS

FIG. 5 is an illustration of a member's cloud points page according to some embodiments of the present invention.

FIG. 6 is an illustration of an ad conversion distribution page according to some embodiments of the present invention.

FIG. 7 is an illustration of a member's cloud points page according to some embodiments of the present invention.

FIG. 9 is an illustration of a member's cloud points page according to some embodiments of the present invention.

FIG. 12 is an illustration of a member's bounta wallet transfer page according to some embodiments of the present invention.

DETAILED DESCRIPTION

The present invention is a system and method in the form of a social network, or a social media management dashboard, provided via the Internet which allows users to perform actions which accumulate ranking points in a variety of ways. The ranking points allow for a user to gain priority in advertising revenue sharing, which the user may then designate for distribution to chosen organizations, or may retain for exchanging for goods or services from participating vendors.

Another aspect of the present invention is that the system and method allows for user participation in deciding how to allocate advertising revenues generated by advertising on the system. In a typical web-based system, advertising revenues accrue to the system operators. With a retail sales focused website, for example one which allows for the purchase of shoes, the revenue and profit for the website may derive substantially or completely from profit on the sales of the goods being sold.

On other websites, such as a social media website or dashboard, or such as news websites, the revenue for the website may derive substantially from advertising which occurs in spaces within the website pages. Advertising revenue may accrue due to conversions, which can include clicking through the ad to the advertiser's webpage, or it may accrue as advertisers pay to have their ads displayed. Whereas a typical website retains advertising income, with the present invention the system operators allow the participants in the system (which may be a social media website) to direct advertising revenue towards preferred recipients. The participants may also have an opportunity to retain advertising revenue accrued by the system.

Figure 1:
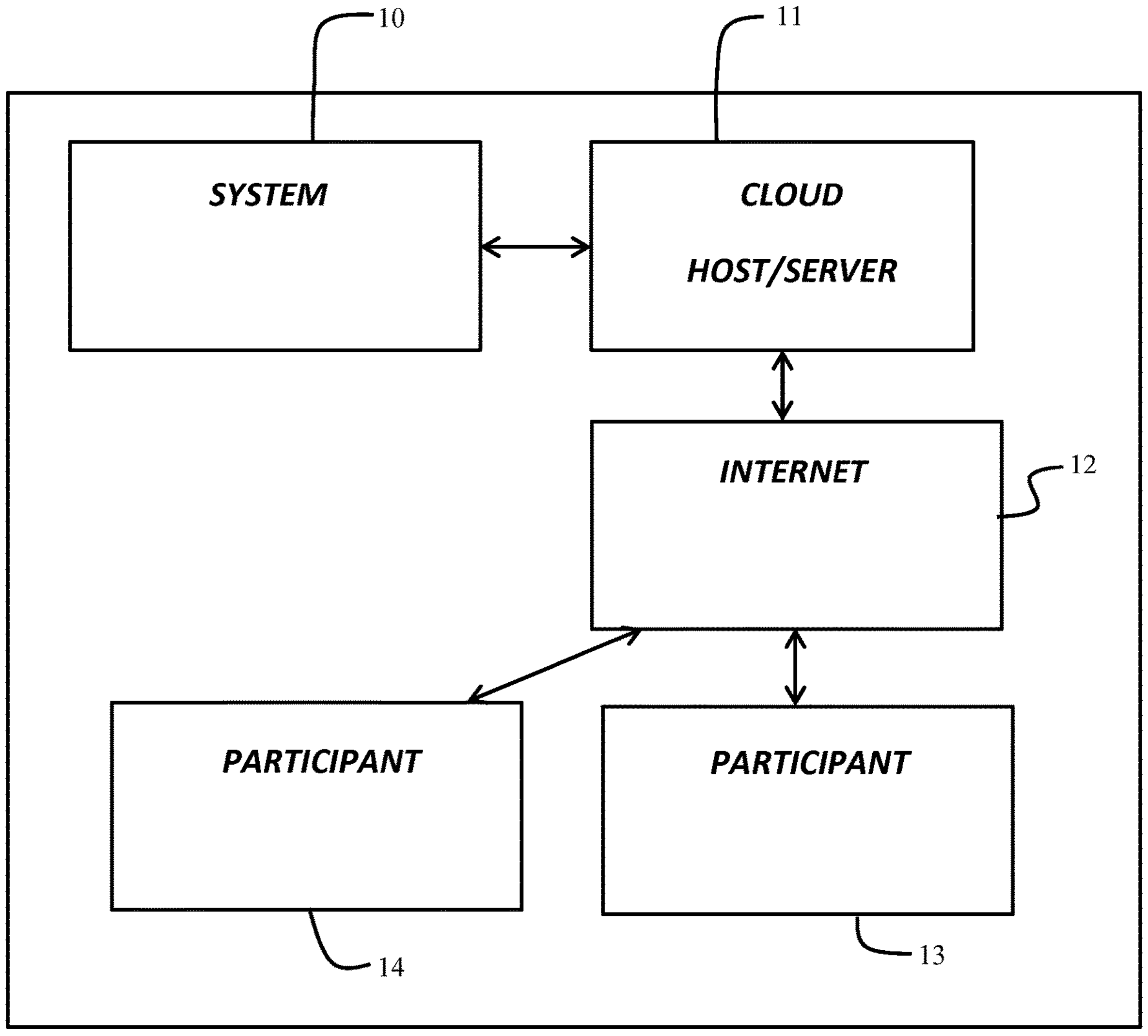
FIG. 1 is a sketch presenting an overview of a system in use according to some embodiments of the present invention.

FIG. 1 illustrates the system for crowd funding using a web based social networking site 10 as it routes through a cloud host to the Internet. In some embodiments, the system 10 allows participants 13, 14 to participate over the internet 12. The system 10 may be hosted within or linked to a cloud server 11 which provides the participants 13, 14 access and functionality without having to download executable software into the computers of the participants. Although two participants 13, 14 are shown in FIG. 1, it is understood that many participants are anticipated, including tens of thousands or more.

Figure 2:
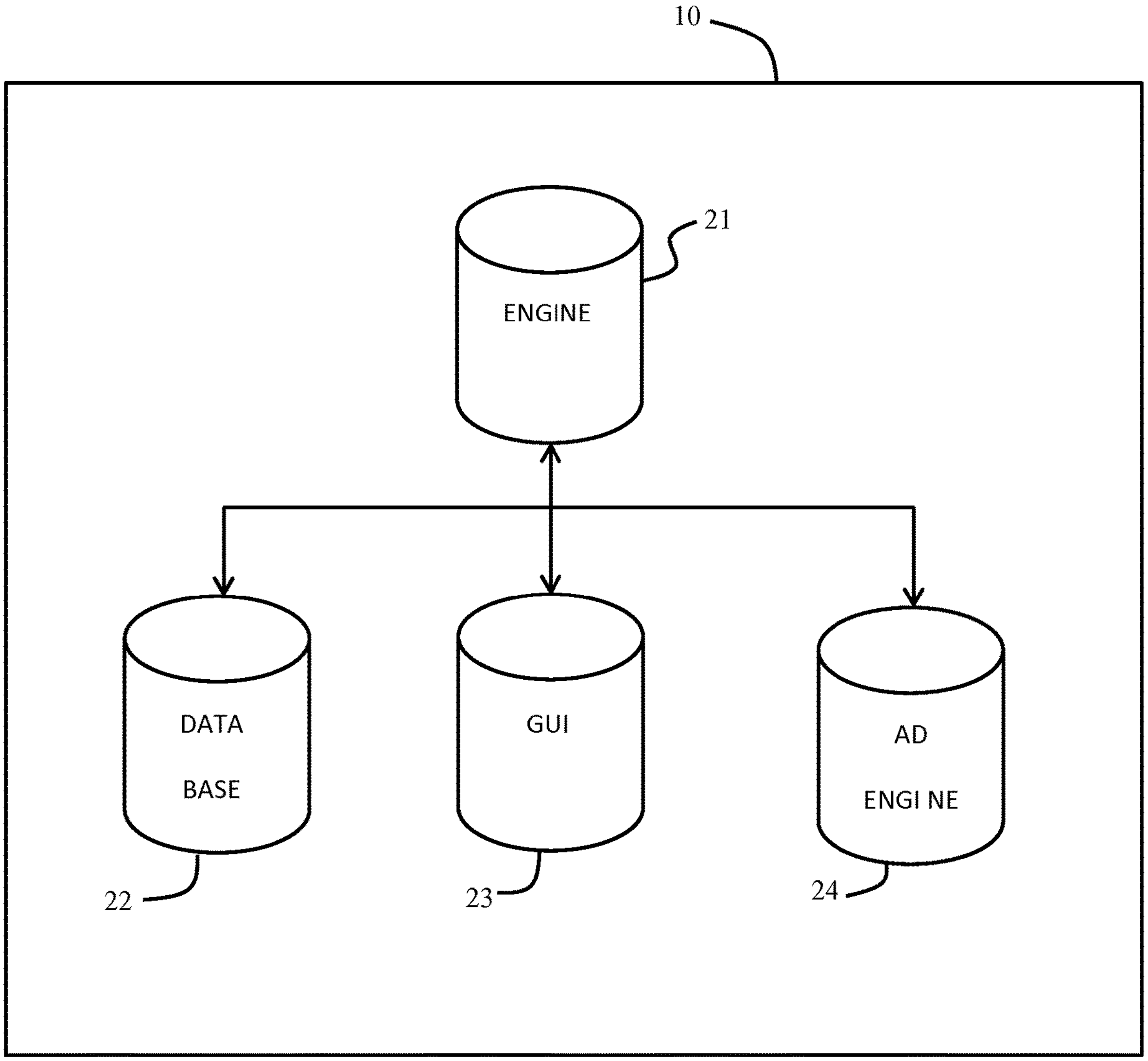
FIG. 2 is a sketch of a system according to some embodiments of the present invention.

FIG. 2 is a diagram of the system architecture of a social media system 10 according to some embodiments of the present invention. The social media system interacts with users via a network, such as the Internet. The system may include modules which interact with each other in order to provide the functionalities of the system. The system may include an interface module 23, a site function module/engine 21, an advertising manager engine module 24, and a database module 22.

The advertising manager engine module, which may also be referred to as an ad manager, handles functions including ascribing ad revenue, or ad revenue generation possibilities, to various users and participants. The advertising manager may be adapted to manage the distribution of advertising revenue according to the desires of the various participants, and with regard to the ranking of the participants relative to each other in some aspects. For example, when using a third party advertising service which places ads into designated spaces within web pages the revenue that may come from conversions can be directed to a designated party. The third party advertising service may use an affiliate code for each placed ad such that the party linked to that affiliate code automatically gets the revenue from conversion of that ad directed to them. In such an example, the system need not handle monies from the conversions, but rather facilitate the proper designation of ad spaces with the proper affiliate codes.

The advertising manager module would thus continually refresh ad spaces with new affiliate codes as required by the advertising manager module. For example, in a system with dynamic ranking of participants, higher ranked participants would have their affiliate code (or the code of a group or individual selected by them) linked to advertising spaces more often than lower ranking participants. The advertising module may create a string, for example, which allocates the available ad spaces to the ranked participants in a quantity proportional to the height of their ranking. As seen below, however, participants may choose to designate their allocated ad spaces to other participants. When revenue is generated from an allocated ad space, and if that allocated space is allocated to a designee with an affiliate code, the revenue will be sent directly to the designee by the third party advertising service.

In some embodiments, the system may use its own advertising manager module to create and manage its own advertising space identification system such that a third party advertising service is not needed. For example, the advertising manager module may assign a code, or other designator, to each user, to each participant, and to each participating vendor. These codes may be used to create a priority matrix, or string, allocating advertising spaces on displayed pages. Conversion revenue opportunities may be created based upon association of an advertising space with the code of a user or participant. The ranking of the participants allows for determination of how often a participant's code would be associated with an advertising space. Although the ranking of a participant could dictate how often that participant's code might be associated with an advertising space, that ranked participant could have allocated their advertising spaces, and the potential revenue associated with such a space, to another group or individual participant, as discussed below.

Figure 3:
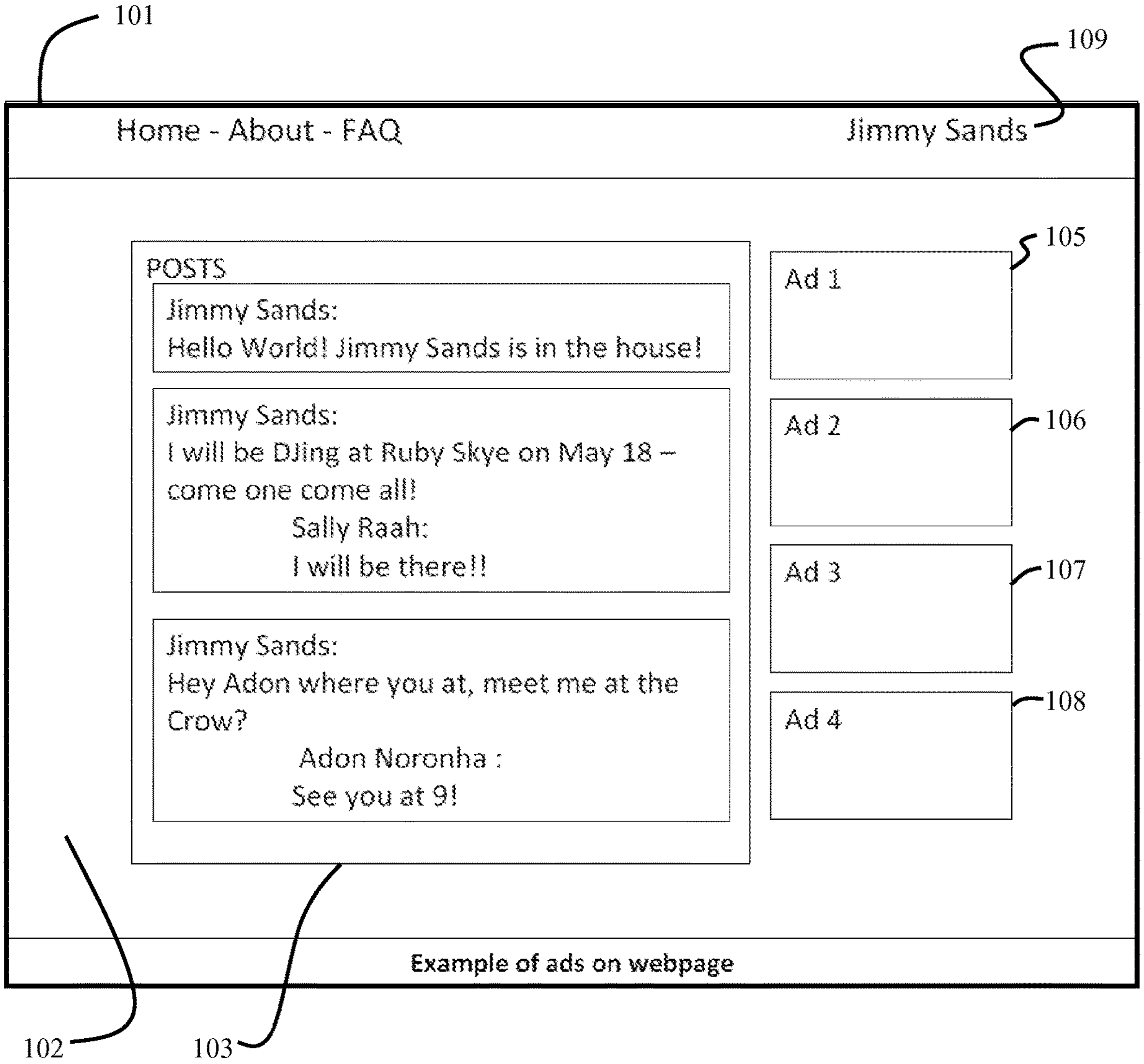
FIG. 3 is an illustration of a user's home page according to some embodiments of the present invention.

FIG. 3 illustrates an exemplary participant user's home page 101 on a social networking website according to some embodiments of the present invention. Individual participants would have one or more specific pages which could be visited by the participant, by other participants, or in some instances other non-participant users. The participant may be identified 109 within the page 101. The framed field 102 of the page 101 may be populated with different items. In some embodiments, the field 102 may be substantially filled with posting fields of other social media sites. In this regard the system may function as a social media management dashboard. In another embodiment, the page 101 may include a posting area 103 for posts onto the participant's page by the participant or others. In this regard the system would function as a social media website.

The posting area 103 includes posts placed by the participant user on their own home page, or posts made by other participants. Also embedded within a participant's home page are a plurality of advertising spaces 105, 106, 107, 108. In some embodiments, the ad spaces are coupled to a third party advertising provider such that the advertising provider places the ad into the space. In this aspect, the ad spaces 105, 106, 107, 108 may have codes, often referred to as affiliate codes, ascribed to them. The third party advertising provider may then pay the affiliate associated with the code, based upon conversion of the ad. The amount paid may differ depending upon the type of conversion.

Although conversion may be used to indicate that a site visitor had been converted into a paying customer, other types of actions may result in compensation from the advertiser, or a third party advertising provider. For example, payment may be made based upon viewing, which may simply be a payment for each placement on a page. Payment may be made for a click through on the ad to the advertiser's page. In some aspects these actions may be considered a conversion, although a typical usage of the term may be that the viewer has purchased from the advertiser's home page. Each of the actions described above may have a different compensation associated with them, with a purchase on the advertiser's site typically bringing the highest compensation. A click through onto an advertiser's site, which would be the result of clicking on an ad seen on a page such as a participant's home page, would also bring compensation from the third party advertising provider.

Separate from the compensation aspect resulting from the conversion as discussed above, ranking points may also created and distributed based upon the clicking upon ads on a participant's page. For example, should a visitor click through on an ad seen on a participant's page, such as an ad 105 on the page 101 of a participant 109, not only might that act create advertising compensation for the affiliate associated with that ad display, but the act of clicking will create one or more ranking points for the participant 109 whose page 101 is being utilized. In addition, should the person doing the clicking also be a participant, that person may also have acquired one or more ranking points by this same action. Thus, the action of the ad click becomes a multifunction action with a plurality of results. Ranking, as discussed below, includes continual monitoring of actions taken by participants, and also the monitoring of actions taken on participant's pages.

In some aspects, the actions as discussed above result in an accumulation of ranking points, also referred to as cloud points. The ranking itself may be done at time intervals such as weekly, or daily. In addition, in some aspects, the participant may be able to decide how many of the accumulated ranking points to use for that time period's ranking, how many to save, and how many to send to other participants.

In some embodiments of the present invention, the affiliate code coupled to the embedded ad spaces may change periodically so that different affiliate members will be compensated depending upon which space, on which page, and at what time, the ad is being seen and acted upon. By altering affiliate codes, the system allows for distribution of advertising compensation to different affiliates. Each participant of the social network may be assigned an affiliate code so that each participant could accrue compensation from conversion occurring on ads which resided in ad spaces linked to their affiliate number. Although each ascription of an affiliate code results not in revenue, but only in an opportunity for revenue generations depending upon conversion, it is envisioned that over a length of time that the relative values of revenue generations would reflect the relative proportions of revenue generation opportunities, or the conversion rate.

In some embodiments of the present invention, the compensation from conversion of advertising seen on pages of participants may be directed to allow for Cloud Funding of groups, or others, selected by the various participants. Groups seeking Cloud Funding from the system would have affiliate codes so that they could receive the benefit of compensation from ad conversions as described above. In some embodiments, the groups could be non-profit groups such as conservation groups, groups which helped the disadvantaged, or others. The opportunity to help such groups may draw potential participants to a social network which allows participants such a feature. In some aspects, Cloud Funding of new businesses could occur using the revenue generated from conversion of advertising space allocations. In some aspects, a participant could have revenues directed to a new venture seeking Cloud Funding, and when sufficient revenues had been attained a transfer to that entity could be affected. In some aspects, a participant could have revenues directed to a new venture seeking Cloud Funding for open ended revenue generation without time or funding restrictions. In contrast to other means of attracting funding, methods according to some embodiments of the present invention may be referred to as Cloud Funding.

Using the ad spaces 105, 106, 107, 108 as an illustrative example, the ad spaces may be assigned to support different aspects of the system. For example, the first ad space 105 may have an affiliate code which is linked to the website system itself, such that compensation from ads in that ad space returns to the system operators to pay for system operations. Although the first ad space 105 is seen on the home page 101 of this particular user, it may be that a similar first ad space will be present on each page of each participant, and that may represent thousands or more spaces.

A second ad space 106 within the pages of the system may have an affiliate code related to a dynamic ranking of the system participants. System participants may accrue dynamic ranking points, also referred to cloud points herein, based upon use patterns on the social networking system. For example, a first participant may get ranking points for making an entry onto the posting section on his/her own home page. In addition, the same first participant may get ranking points for making entries onto another's posting section on that other participant's home page. The first participant may also get ranking points for clicking onto an ad on one of the website pages. If the first participant clicks through on an ad on another's page, both the first participant and that other participant may both get ranking points. The accumulation of ranking points may be indicative of the activity level of that participant. The ranking points may be referred to as Cloud Points.

The rank of the participants may be calculated periodically, which may be weekly, for example. The participant with the most ranking points would be ranked highest, and so on. The rank of a participant may be used to determine how often their affiliate code, or an affiliate code designated by them, would be coupled to an ad in the second ad space 106 of web pages across the system. For example, if the affiliate code of a second ad space on every page changed every time the page was visited or refreshed, this would allow for a sequence of affiliate codes to be coupled to these ad spaces. How often a particular participant's affiliate code would be placed would depend on the rank, with higher ranking participants having their code placed more often in the aforementioned sequence.

A third ad space 107 within the pages of the system may have an affiliate code related to a static ranking of the system participants. System participants may accrue static ranking points based upon activities they foster on the social networking system. For example, a first participant may get static ranking points by inviting a new member into the system. The first participant may accrue a plurality of static ranking points by continually recruiting new members. The recruitment of a new member may occur by the act of a visitor to a first participant's page initiating the process to become another participant while on that first participant's page. A hierarchy of such recruitments may occur, such that any subsequent recruitments by a recruited member also feed static ranking points up the chain to the first participant. In some embodiments, there may be a separate ad space, or set of ad spaces, coupled to the static ranking points alone. In some embodiments, the static ranking points may be spread into the dynamic ranking model but as points that do not need to be continually refreshed, as dynamic ranking points need to be. In some embodiments, all accrued points fall under the category of Cloud Points, without the separate category of static ranking points.

A fourth ad space 108 within the pages of the system may be affiliated with the participant whose home page the ad space resides within.

Figure 4:
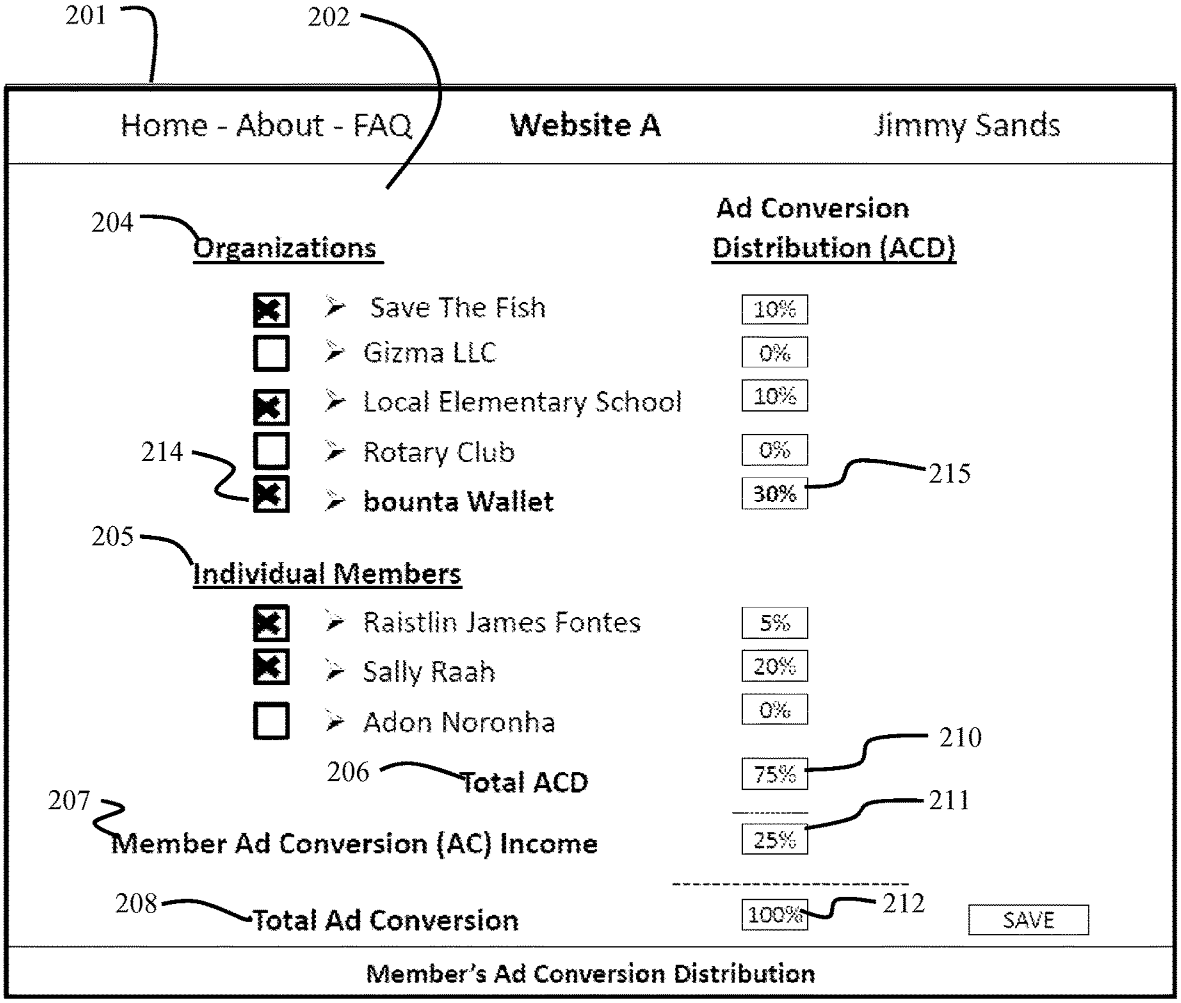
FIG. 4 is an illustration of an ad conversion distribution page according to some embodiments of the present invention.

FIG. 4 illustrates an Ad Conversion Distribution page 201 according to some embodiments of the present invention. An Ad Conversion Distribution system allows a participant to allocate some or all of his ad placement spots, such as those which would be given out as part of the sequence of affiliate codes mentioned above. For example, a first participant's rank may result in that participant having an ad space assigned to them 6 times in one hour. Without ad conversion distribution, the first participant's affiliate code would be coupled to each of the 6 ad spaces assigned to the participant, and the first participant would be the beneficiary of all compensation from ad conversions of the ads placed in the 6 ad spaces. However, with an Ad Conversion Distribution (ACD) system, the first participant may select groups, or others, to receive the benefit of the compensation from ad conversions of the ads. This may be done by the substitution of the first participant's affiliate code with the affiliate code of the group or individual selected. In this manner, the third party advertising provider may pass on the compensation to the selected participant directly. Other ways to divert the benefit of the compensation may also be used.

Within the main field 202 of the ACD page 201 for a participant, the participant may select groups 204 or other participants 205 and assign to them a percentage of the ad spot opportunities which are ascribed to the participant. Any compensation that then accrues due to conversion on ads in those spaces would be sent directly to the affiliate whose affiliate code was coupled to that ad space. In addition to other groups or participants, the participant may divert ad conversion revenue to a wallet 214 at a chosen percentage 215. The participant's wallet may be used to accrue ad conversion revenue, and also may be used to accrue ranking points, as discussed below. As seen, the total distribution 206 to other groups, members, or the bounta wallet may be less than 100% of the conversion revenue 210, leaving the remaining portion 207, 211 as income to the participant. The total ad conversion 208 selected and/or directed by the participant does fill out the entire 100% 212. The ACD page may be accessible and viewable only to the participant whose choices this ACD page represents. A system administrator may also have access to this information.

FIG. 5 illustrates a Cloud Points Transfer page 230 according to some embodiments of the present invention. A Cloud Points Transfer system allows a first participant to allocate some or all of their accumulated ranking points (also referred to herein as Cloud Points), such as those which would be accumulated when other participants use the first participant's page, or as the first participant engages in actions on other pages. Just as Ad Conversion opportunities can be allocated by a participant to other participants, such as groups, persons, or Cloud Funding options, Cloud Points can also be allocated by a participant. Although a particular participant may choose to retain all of his/her ranking points to allow for a higher ranking, and thus more ad conversion opportunities, likewise a participant may choose to divert some of those accumulated ranking points to others. In additions to organizations 232 and individual members 233 to whom the participant may transfer ranking points, the participant may also select how many cloud points 234 to exchange for ranking. The Cloud Points exchanged for ranking 234 are then used in the hierarchical determination of rank which sets the relative amounts of ad conversion opportunities granted the participant. Accumulated ranking points not diverted to others, or exchanged for ranking, may be retained, or banked. In some aspects, a participant may find diverting ad conversion opportunities to be a more useful diversion, and thus choose to use all accumulated ranking points for each time periods ranking. This higher ranking may lead to more conversion opportunities, which the participant then diverts to others. Of course, other participants may choose a different strategy.

FIG. 6 illustrates another Ad Conversion Distribution page 261 according to some embodiments of the present invention. Within the main field 262 of the ACD page 261 for a participant 273, the participant may select organizations 264 or other participants 265 and assign to them a percentage of the ad spot opportunities which are ascribed to the participant. Any compensation that then accrues due to conversion on ads in those spaces would be sent directly to the affiliate whose affiliate code was coupled to that ad space. In addition to other groups or participants, the participant may divert ad conversion revenue to a wallet 274 at a chosen percentage 275. The participant's wallet may be used to accrue ad conversion revenue, and also may be used to accrue ranking points, as discussed below. In this illustrative example, the organization Save The Fish 262 has been allocated 10% 269 of the ad conversion revenue, as has the Local Elementary School. The participant's bounta wallet 274 had been allocated 40% 275 of the ad conversion revenue. In addition, Individual Members 265 also have been allocated ad conversion revenue. The two members designated in this example have been allocated a total of 15% of the ad conversion revenue. As seen, the total distribution 276 to other groups, members, or the bounta wallet may be less than 100% of the conversion revenue 270, leaving the remaining portion 277, 271 as income to the participant. The total ad conversion 278 selected and/or directed by the participant does fill out the entire 100% 272. In this example, the members ad conversion revenue, converted to income, is 25% of the total revenue generated by the ad spaces allocated to the participant/member.

In some embodiments, the activity on the site, by the participant and by visitors to the participant's page, result in the accrual of dynamic ranking points. In some embodiments, the system may automatically calculate a new ranking of the participants at a pre-determine interval, such as weekly. The ranking then determines how much opportunity the participant will have to accrue ad conversion revenue. A higher ranking creates more opportunity. In some embodiments, rather than an automatic ranking, the system may allow for manipulation of the accumulated dynamic ranking points by the participants. For example, the dynamic ranking points may be sent to another participant to allow that other participant to get a higher ranking that week. Also, dynamic ranking points (Cloud Points) may be saved to be used at a later date.

FIG. 7 illustrates another Cloud Points Transfer page 280 according to some embodiments of the present invention. A Cloud Points Transfer system allows a participant to allocate some or all of his accumulated ranking points (also referred to herein as Cloud Points), such as those which would be accumulated when other participants use the first participant's page, or as the first participant engages in actions on other pages. In some embodiments, a single participant may have multiple websites, or webpages, within the system, and the participant may choose to allocate ad conversion and Cloud Points differently for each site, or each page. In the illustrative example of FIG. 7, a second website for the same participant as seen in FIG. 4, for example, is now having its allocations selected. Typically, only the participant, or a system administrator, would have access to these types of pages. Participants would typically be limited to accessing and using the social networking pages, as illustrated in FIG. 3.

In this illustrative example, the participant has selected to divert some cloud points used for ranking 281 to some organizations 282, such as Save The Fish 287, to the participant's bounta wallet 288, and to some individual members 283. In addition, the participant has elected to exchange some points for ranking 284, while retaining other points as banked cloud points 285. A listing of total lifetime earned Cloud Points 286 may also be displayed.

Figure 8:
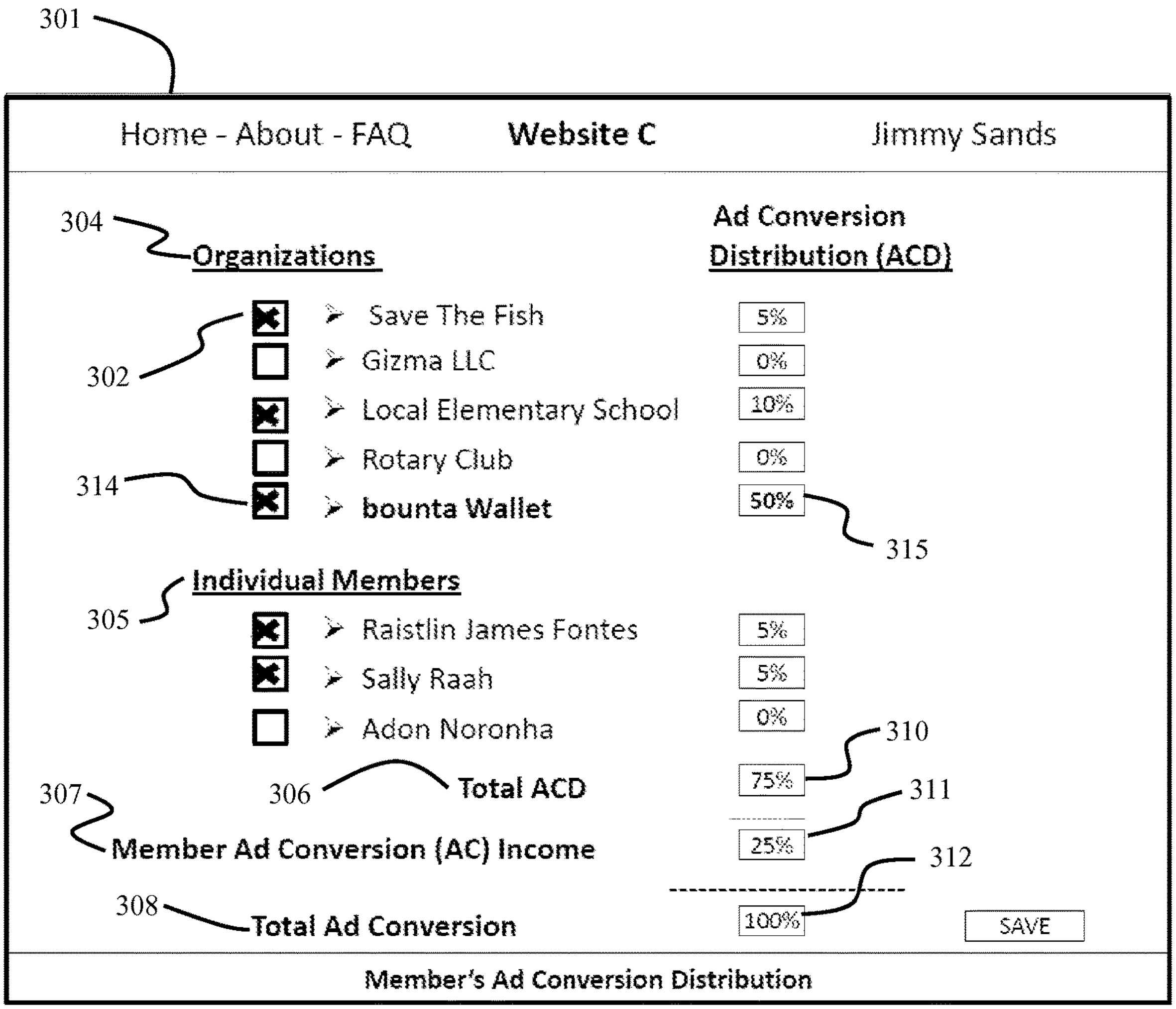
FIG. 8 is an illustration of an ad conversion distribution page according to some embodiments of the present invention.

FIGS. 8 and 9 illustrate setting for allocations of ad conversion distribution and Cloud Points allocation, respectively, for yet a third site of a particular user. Although multiple websites of a single user are illustrated to provide an example of functionalities of the system in such a circumstance, it is anticipated that a typical user will have a single webpage, functioning as the participant's home page on the social networking site, and that the participant also then would have a single ad conversion distribution page, and cloud points allocation page. These latter two pages would be seen only by the participant, or a system administrator, in typical usage.

In this illustrative example, organizations 304 and individuals 305 have been designated to receive ad conversion revenue. The organization Save The Fish 302 has been allocated 5% of the ad conversion revenue, whereas the Local Elementary School has been allocated 10%. The participant's bounta wallet 314 had been allocated 50% 315 of the ad conversion revenue. In addition, Individual Members 305 also have been allocated ad conversion revenue. The two members designated in this example have been allocated a total of 10% of the ad conversion revenue. As seen, the total distribution 306 to other groups, members, or the bounta wallet may be less than 100% of the conversion revenue 310, leaving the remaining portion 307, 311 as income to the participant. The total ad conversion 308 selected and/or directed by the participant does fill out the entire 100% 312. In this example, the members ad conversion revenue, converted to income, is 25% of the total revenue generated by the ad spaces allocated to the participant/member.

FIG. 9 illustrates designations for a participant member's cloud ranking points according to some embodiments of the present invention. In this illustrative example, the participant has selected to divert some Cloud Points 291 to some organizations 292, such as Save The Fish 297, to the participant's bounta wallet 298, and to some individual members 293. In addition, the participant has elected to exchange some Cloud Points for ranking 294, while retaining other points as banked Cloud Points 295. A listing of total lifetime earned Cloud Points 296 may also be displayed.

Figure 10:
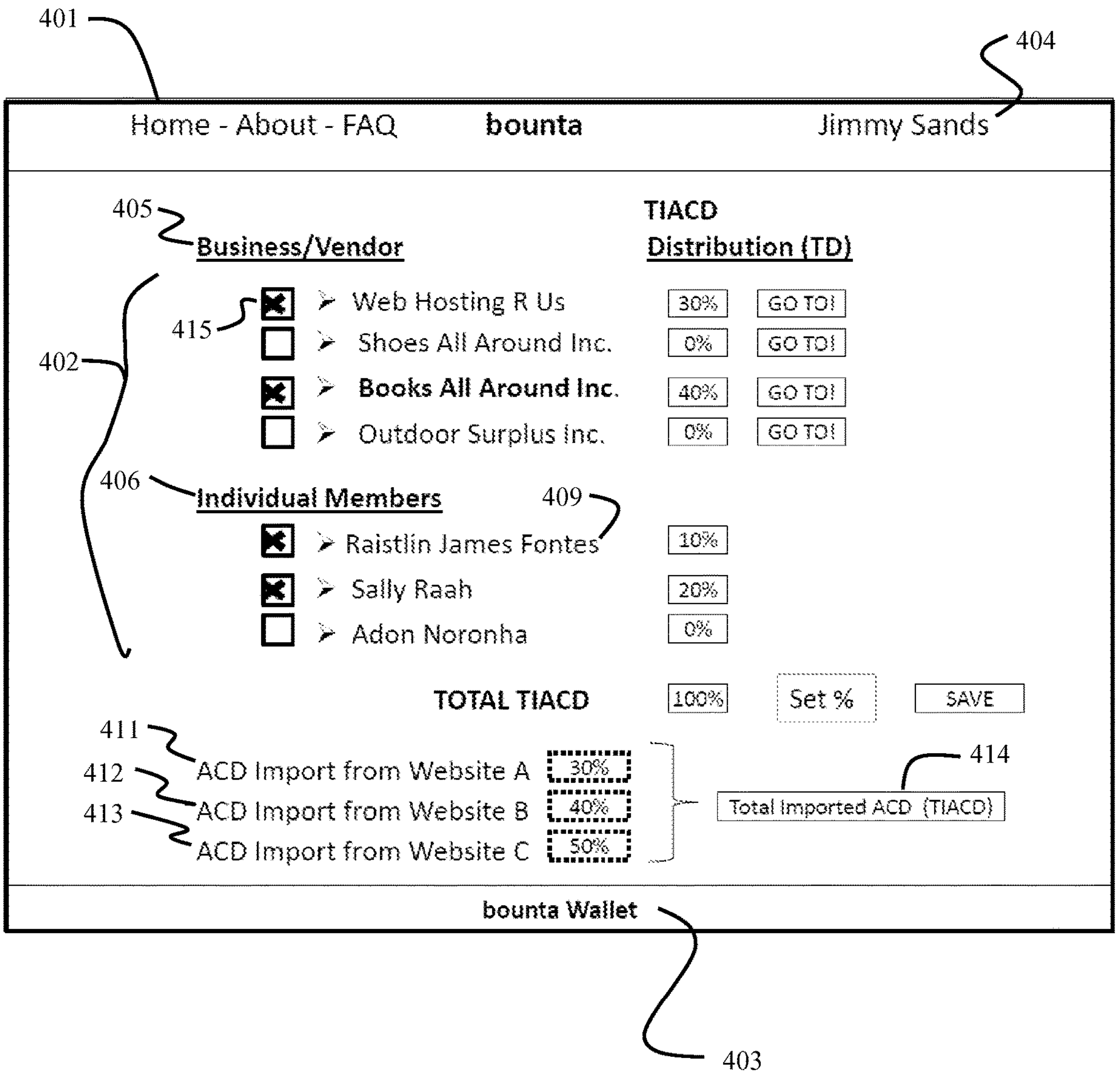
FIG. 10 is an illustration of a member's bounta wallet page according to some embodiments of the present invention.

FIG. 10 is an illustrative example of a page 401 displaying a portion of a participant's 404 bounta wallet 403. Within the face 402 of the page 401 are the settings for how the participant desires to route imported ad conversion distributions. The imported (or transferred) ad conversion comes from the ad conversions designated as going to the participant's bounta wallet when the diversions were selected at that level. In this illustrative example, the participant 404 had three websites within the system, and the total imported ad conversion distribution 414 as seen on this page result from the bounta wallet designations for ad conversion on the participant's first page 411, second page 412, and third page 413. This imported ad conversion distribution may be now further diverted by the participant to businesses 405 or other individual members 406. By "spending" out of the participant's bounta wallet, the participant may interact with vendors affiliated with the system such that ad conversion opportunities are ascribed to a vendor, and when enough revenue has accrued to the vendor a pre-selected good or service may be exchanged to the participant. In this way, the participant acquires the good or service, but may be viewed as not having purchased it, as no monies from the participant were involved.

Figure 11:
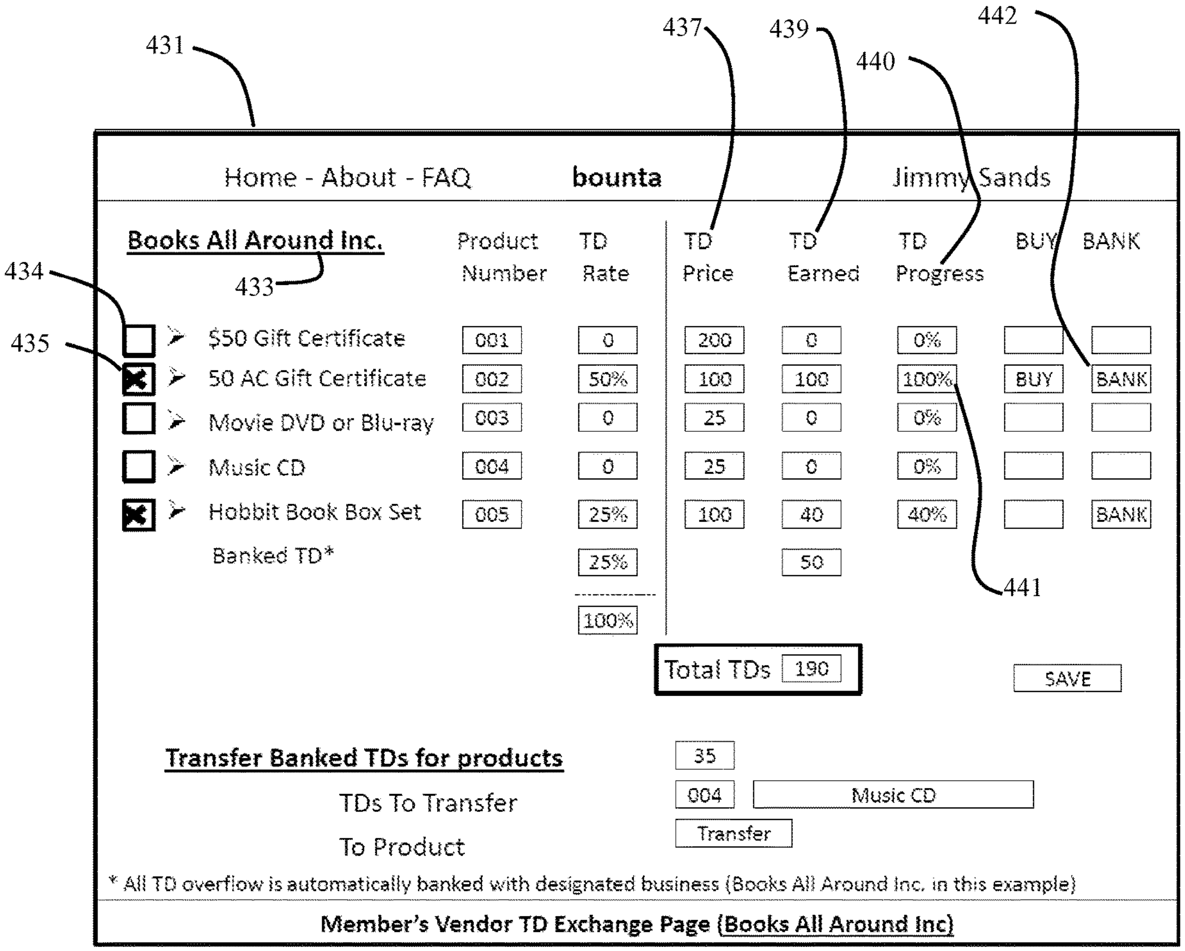
FIG. 11 is an illustration of a member's vendor exchange page according to some embodiments of the present invention.

FIG. 11 is illustrative representation of a page 431 wherein a participant has selected particular items to be acquired from a specific vendor 433 which had been identified as a receiving vendor for diversion from the participant's bounta wallet. Referred to as a participant's Vendor TD Exchange Page, the page allows for the participant member to interactively set and select products 434, 435 from a particular participating vendor 433. Using as an example a selected product of a gift certificate 435, the participant may see the price 437, the amount earned towards this price (from ad conversion allocated towards this vendor) 439, the percentage progress 440, whether to buy the item 441, and also that excess directed revenue (beyond what is needed to acquire the designated item) from ad conversion allocations shall be banked 442. In some aspects, the participant was able to designate the selected items by clicking on the vendor from a list of vendors, and then designating the vendor as a vendor towards which ad conversions would be directed. This may create a vendor specific page for the participant represented in FIG. 11. Also, the participant may be able to visit a separate site for that vendor to view various items which can be acquired. Once selected, such items will then appear on the member's Vendor TD Exchange page 431.

Figure 13:
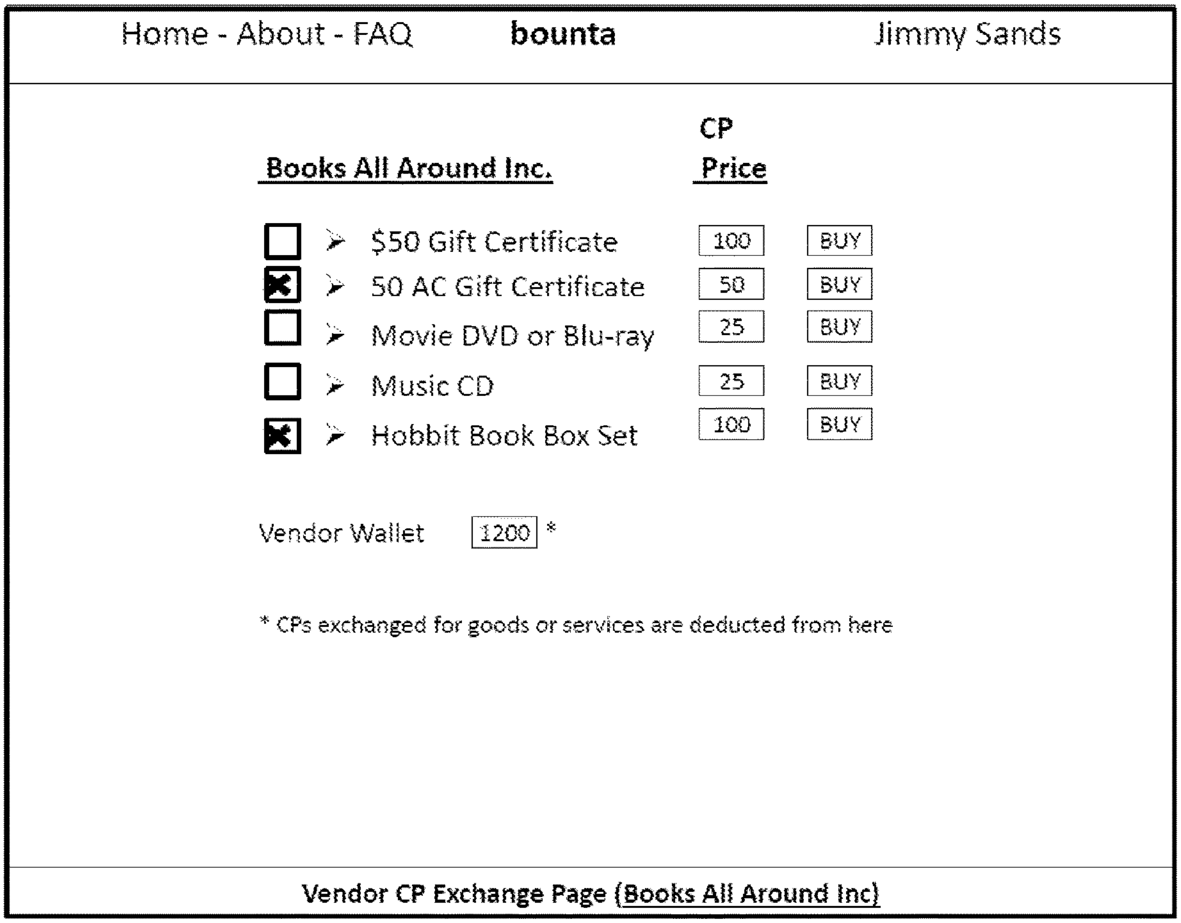
FIG. 13 is an illustration of a vendor member's exchange page according to some embodiments of the present invention.

FIGS. 12 and 13 illustrate vendor specific selection but instead of ad conversions, as in FIGS. 10 and 11, and the resulting monies deriving therefrom, the member is able to exchange Cloud Points for vendor supplied items. For example, a participant may have transferred Cloud Points to its bounta wallet 298, as was seen in FIG. 9. The Cloud Points may then be used to acquire goods or services from participating vendors.

The use of Cloud Points, and the facilitation of cloud funding including transferring Cloud Points to other participants, may occur in transaction types other than social media websites, or social media dashboards. For example, a website used for searching the internet may include participants who accumulate Cloud Points by using the website, for visiting sites found in the search results, and further for engaging those visited sites, including making purchases on them. In a similar fashion, then, the participant acquires the good or service, but may be viewed as not having purchased it, as no monies from the participant were involved.

The accumulation of Cloud Points for engaging in actions, as described above, allows a multitude of actions to be linked into the Cloud Point system. As Cloud Points are accumulated, the participants can transfer cloud points to other participants, such as a favored non-profit group, for example, allowing the group to realize benefits, including monetary benefits, due to the actions of the directing participant, but without the requirement of a direct financial contribution by that directing participant. In some embodiments, Cloud Points may be accumulated in ways not limited to interactions online. Purchases at brick and mortar stores (affiliated stores) would allow for Cloud Point accumulation. Activity on other social media or other professional tools such as texting or messaging platforms could also generate cloud point accumulation as described above.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A method for alternating revenue designations which may provide an opportunity for allocating revenue derived from conversions of advertisements on a social networking website, the method comprising the steps of:

allowing a first participant to accumulate ranking points based upon activity by said first participant on said first participant's and other participant's social profile pages wherein said ranking points are stored in a database in a social media system;

creating a ranking of participants based upon accumulated ranking points, wherein said ranking is stored in a database in a social media system;

creating a string in an advertising manager module which allocates available advertising spaces to the ranked participants in a quantity proportional to the height of their ranking;

allowing said first participant to designate a third party, said third party having an affiliate code, for receipt of participant's revenue designation opportunity;

alternating revenue designations for advertising spaces on web pages associated with the social networking website using said string, said web pages having one or more embedded advertising spaces, wherein the step of alternating revenue designations comprises coupling an affiliate code representing a selection of a third party by said first participant to one of said one or more embedded advertising spaces, wherein the revenue generated by an advertising space coupled to a third party's affiliate code is sent directly to said third party by a third party advertising service.

2. The method of claim 1 further comprising the step of allowing a participant to transfer accumulated ranking points to another participant.

3. The method of claim 1 wherein the activities which generate ranking points for a participant comprise making an entry onto the participant's page's posting field.

4. The method of claim 3 wherein the activities which generate ranking points for a participant further comprise making an entry onto a different participant's page's posting field.

5. The method of claim 4 wherein the activities which generate ranking points for a participant further comprise clicking through an ad from the participant's page.

* * * * *